United States Patent
Mizushima et al.

(10) Patent No.: US 9,817,187 B2
(45) Date of Patent: Nov. 14, 2017

(54) END CAP HOLDER

(71) Applicant: AFL TELECOMMUNICATIONS LLC, Duncan, SC (US)

(72) Inventors: Toshirou Mizushima, Duncan, SC (US); Wenxin Zheng, Duncan, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/646,045

(22) PCT Filed: Sep. 5, 2014

(86) PCT No.: PCT/US2014/054311
§ 371 (c)(1),
(2) Date: May 20, 2015

(87) PCT Pub. No.: WO2015/035179
PCT Pub. Date: Mar. 12, 2015

(65) Prior Publication Data
US 2016/0170143 A1    Jun. 16, 2016

Related U.S. Application Data

(60) Provisional application No. 61/874,731, filed on Sep. 6, 2013.

(51) Int. Cl.
| | | |
|---|---|---|
| *G02B 6/00* | (2006.01) | |
| *G02B 6/255* | (2006.01) | |
| *G02B 6/24* | (2006.01) | |
| *G02B 6/32* | (2006.01) | |
| *G02B 6/26* | (2006.01) | |

(52) U.S. Cl.
CPC .......... *G02B 6/2555* (2013.01); *G02B 6/241* (2013.01); *G02B 6/2551* (2013.01); *G02B 6/262* (2013.01); *G02B 6/32* (2013.01)

(58) Field of Classification Search
CPC .... G02B 6/2555; G02B 6/241; G02B 6/2551; G02B 6/262; G02B 6/32
USPC .............................................. 385/95–97, 137
See application file for complete search history.

(56) References Cited

U.S. PATENT DOCUMENTS

| | | | | |
|---|---|---|---|---|
| 4,666,238 A * | 5/1987 | Borsuk | ................... | G02B 6/322 |
| | | | | 385/61 |
| 5,446,815 A * | 8/1995 | Ota | .......................... | G02B 6/32 |
| | | | | 385/33 |
| 5,805,758 A | 9/1998 | Kim | | |
| 6,480,661 B2 * | 11/2002 | Kadar-Kallen | ...... | G02B 6/2937 |
| | | | | 385/136 |
| 7,128,478 B2 | 10/2006 | Takahashi et al. | | |
| 7,246,949 B2 * | 7/2007 | Thiele | ....................... | G02B 6/32 |
| | | | | 385/130 |

(Continued)

OTHER PUBLICATIONS

International Search Report of PCT/US2014/054311, dated Dec. 12, 2014. [PCT/ISA/210].

*Primary Examiner* — Ellen Kim
(74) *Attorney, Agent, or Firm* — Dority & Manning, P.A.

(57) ABSTRACT

One or more embodiments of the disclosure relates to an end cap holder for fixing an end cap to aid in alignment with an optical fiber prior to splicing by a splicing device. The use of the end cap holder may provide a method to fix an end cap holder having a different diameter from an optical fiber that the splicing device may be set up or adjusted for.

15 Claims, 11 Drawing Sheets

(56) References Cited

U.S. PATENT DOCUMENTS

| | | | |
|---|---|---|---|
| 7,934,874 B2* | 5/2011 | Honma | G02B 6/3846 385/134 |
| 9,354,397 B2* | 5/2016 | Bylander | G02B 6/322 |
| 2003/0138223 A1* | 7/2003 | Sasaki | G02B 6/43 385/93 |
| 2009/0238523 A1* | 9/2009 | Honma | G02B 6/3846 385/96 |
| 2010/0260458 A1 | 10/2010 | Sato | |
| 2011/0262079 A1* | 10/2011 | Kato | B29C 45/0025 385/78 |
| 2012/0099820 A1* | 4/2012 | Rolston | G02B 6/4249 385/59 |

* cited by examiner

END CAP HOLDER

CROSS REFERENCE TO RELATED APPLICATIONS

This application is a National Stage of International Application No. PCT/US2014/054311 filed Sep. 5, 2014, claiming priority based on U.S. Provisional Patent Application No. 61/874,731, filed Sep. 6, 2013, the contents of all of which are incorporated herein by reference in their entirety.

FIELD OF THE INVENTION

The invention is related to an apparatus for holding an end-cap for splicing with an optical fiber.

BACKGROUND

In the related art of optical fiber applications, such as high energy lasers, an end cap having a different diameter from an optical fiber may be useful. By having an end cap of a different diameter, the power density at the end of the fiber can be adjusted or changed. A larger end cap than the diameter of the optical fiber may decrease the power density at the end of the fiber.

In order to mount an end cap to an optical fiber, a method such as fusion splicing may be utilized. This process may utilize a variety of splicing devices.

SUMMARY

One or more embodiments of the disclosure relates to an end cap holder for fixing an end cap to aid in alignment with an optical fiber prior to splicing by a splicing device. The use of the end cap holder may provide a method to fix an end cap holder having a different diameter from an optical fiber that the splicing device may be set up or adjusted for.

According to an embodiment, the end cap may include a first piece, the first piece having a holding portion for accepting an optical fiber end cap; and a second piece, wherein the first portion and the second portion are configured to hold the end cap.

Also, the second piece may include a contacting surface for contact with an end cap.

Further, the end cap holder may include a holding portion of the first piece having a first surface and a second surface, the second surface substantially perpendicular to the first surface.

According to an embodiment, the end cap holder may have a holding portion of the first piece comprises a v-shaped groove.

Also, the end cap holder may include a sponge. The sponge may be in the opening for protection of an end cap surface.

In an embodiment, the end cap holder may include a mounting projection on the first piece. The mounting projection may be on a side of the first piece opposite to a side of the holding portion.

In some embodiments, the holding portion of the first piece may include reference marks of predetermined spacing. The reference marks may have a predetermined spacing and may be useful for positioning shorter length end caps.

Also, the first piece may be connected to the second piece by means of at least one fastener. Alternatively, there may be one fastener and one guide pin.

In some embodiments, the first piece may include a hole for accepting the mounting projection and a retaining part to retain the mounting projection. The retaining part may be a retaining screw.

Furthermore, the second piece may fasten to the first piece to hold an end cap by at least three points of contact.

According to an embodiment, there is a method for aligning an end cap for splicing with an optical fiber. The method includes mounting the end cap to an end cap holder, the end cap holder comprising a first piece, the first piece having a holding portion for accepting an optical fiber end cap; and a second piece. The method further includes mounting the end cap holder to a splicing device and splicing the end cap with the optical fiber.

According to an embodiment, there may be a method for aligning an end cap further including rotating the end cap holder relative to the splicing device.

Further, there may be a method for aligning the end cap for splicing with the optical fiber where the end cap holder is mounted to the splicing device by means of a mounting projection of the end cap holder.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

In splicing an end cap with an optical fiber, it is important to ensure axial alignment of the end cap with the optical fiber. Embodiments of the end cap holder can aid in preventing axial tilt of the end cap relative to the optical fiber. One benefit of the holder is providing a consistent alignment method so that both the end cap and the fiber are axially aligned. It is important to provide sufficient contact through the contact surfaces of the end cap holder to ensure that the end cap is aligned with the optical fiber without tilting.

According to an embodiment of the end cap holder, the end cap holder may be comprised of two pieces, a first piece 12 and a second piece 11.

Figure 1:
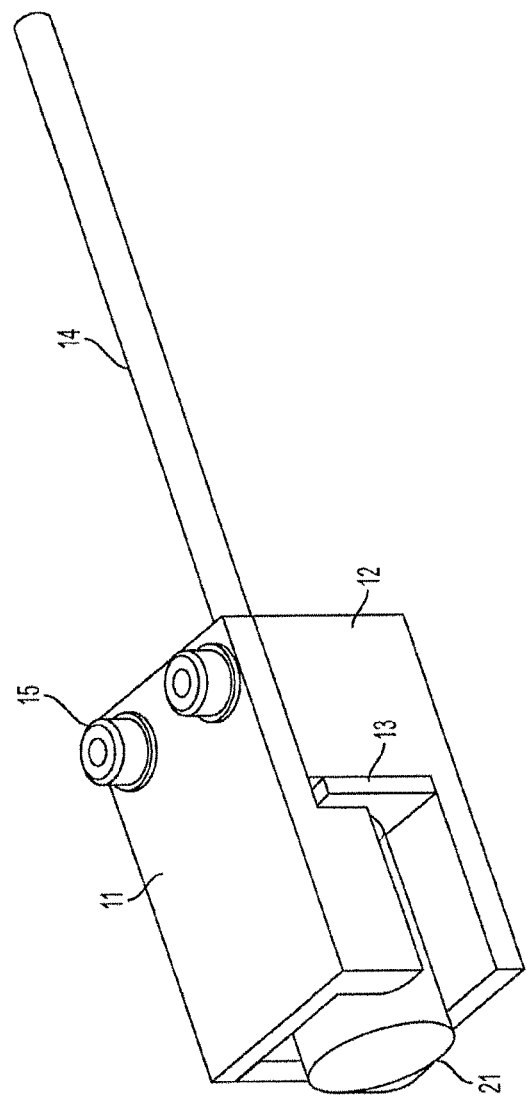
FIG. 1 shows an exemplary embodiment of an apparatus for holding an end cap for splicing.

FIG. 1 shows an exemplary embodiment of the present disclosure. The end cap holder has two pieces, a first piece 12 and a second piece 11. The two pieces can securely hold an end cap 21 in an opening between the first and second pieces. The first piece and second piece can be secured to one another by the means of fasteners, such as bolts 15. In some embodiments, a sponge 13 may be provided for one end of the end cap 21. In some embodiments, a mounting projection 14 can be provided for mounting of the end cap holder to a splicing device.

In the exemplary example, the end cap holder has a generally rectangular shape. However, the end cap holder is not limited to this shape and may be another shape, such as, for example, cylindrical or polygonal.

In one embodiment, the first piece has two surfaces for a first contact and a second contact with an end cap and the second piece has a surface for a third contact with the end cap.

Figure 2:
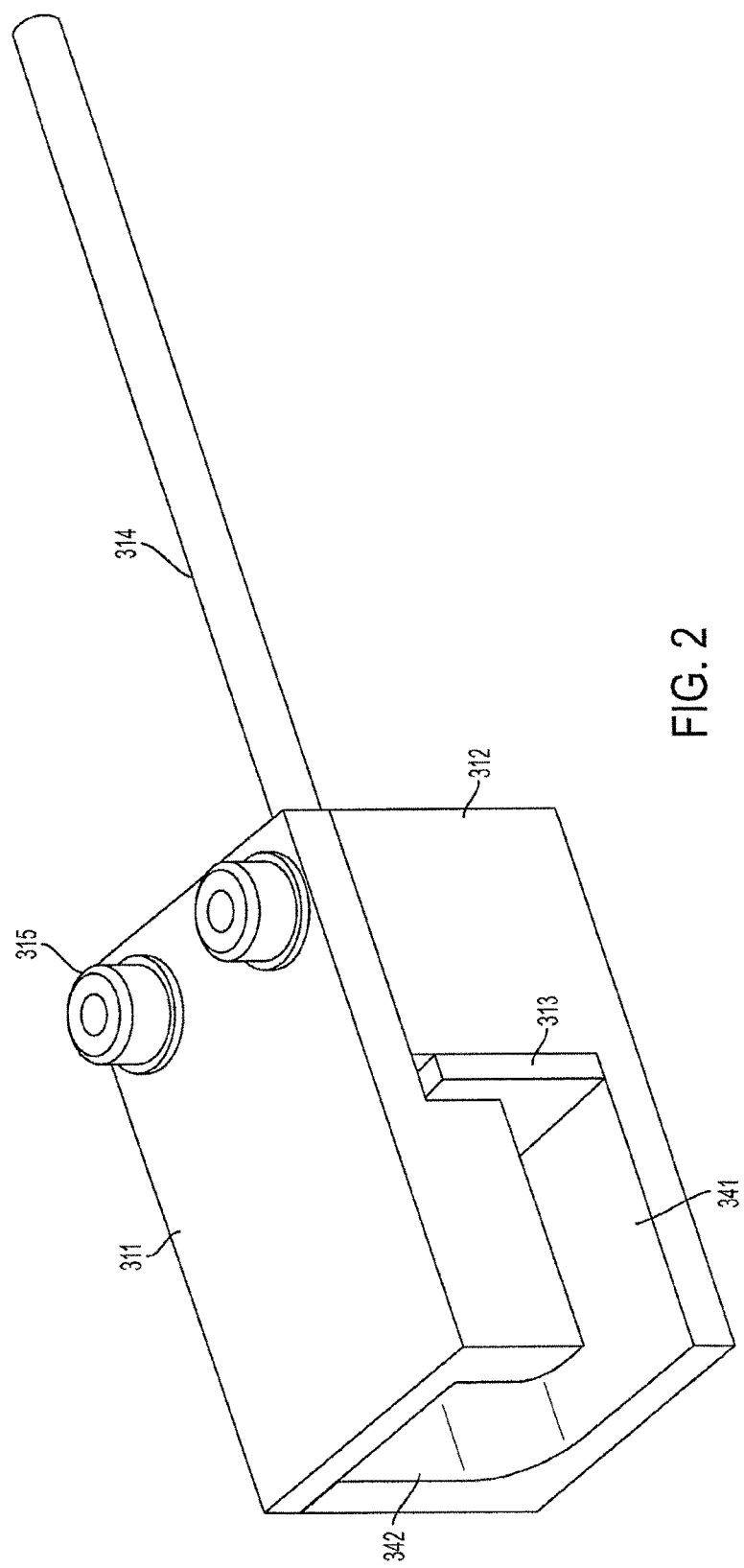
FIG. 2 shows the exemplary embodiment of the apparatus for holding an end cap for splicing.
Figure 3:
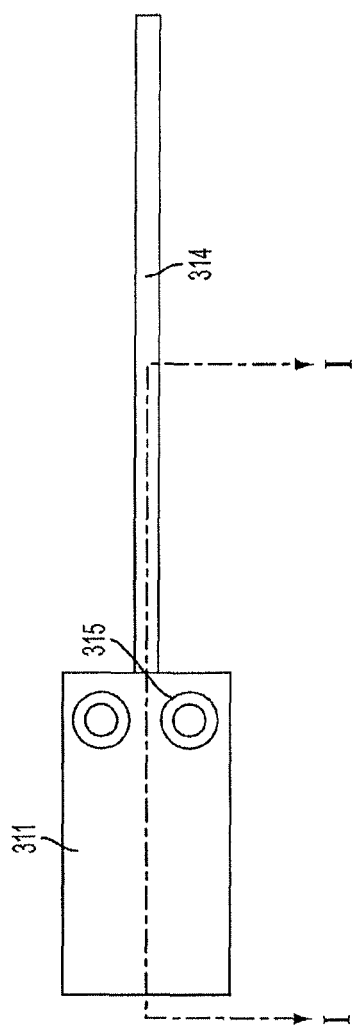
FIG. 3 shows a top view of the embodiment of the apparatus for holding an end cap for splicing.

FIG. 2 shows the embodiment where the first piece 312 has an opening cavity for accepting an end cap. The second piece 311 is disposed on one side of the first piece 312. The first piece 312 and the second 311 are fastened together by fasteners 315. Additionally, a sponge 313 may be provided on a surface of the opening of the first piece. The sponge may be one of any type of material capable of providing padding or protection for an end of the end cap. The sponge material may include rubber, foam, or any equivalent in various forms. FIG. 3 shows a top view of the embodiment.

The opening cavity of the first piece may extend from a first side of the first piece into the first piece.

Figure 4:
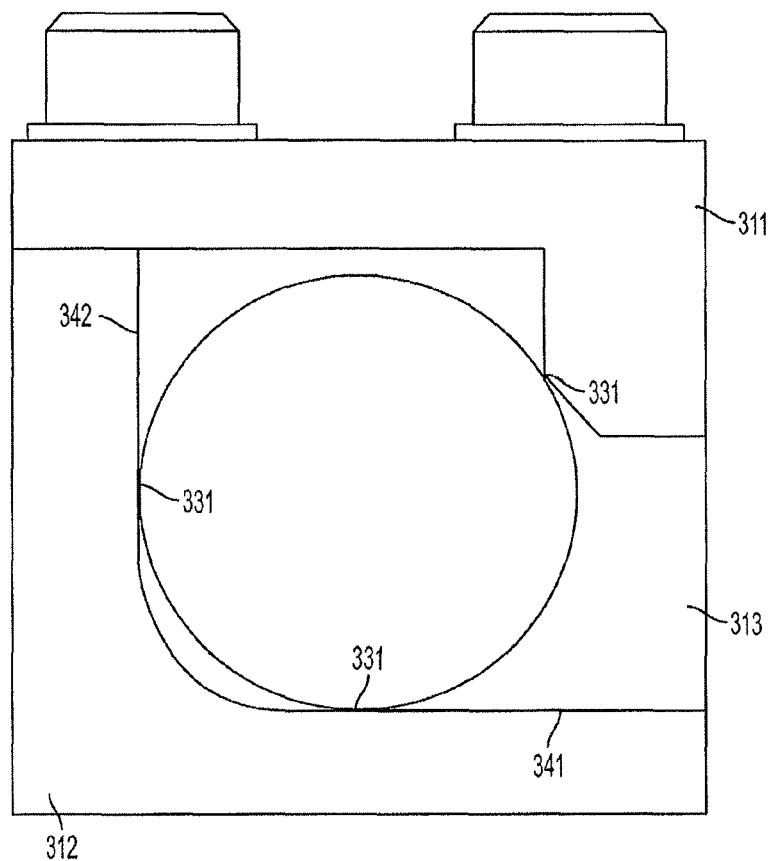
FIG. 4 shows a front view of the embodiment of the apparatus for holding an end cap for splicing.

FIG. 4 shows the embodiment holding an end cap by three contact points 331 on the first piece and the second piece of the end cap holder. By having a first surface 341 substantially perpendicular to a second surface 342 of the opening of the first piece, the holder is able to accommodate end caps of varying diameters while maintaining three points of contact. An inserted end cap can then secured by tightening the second piece to the first piece by means of the fasteners 315 such that three points of contact to the end cap are achieved.

Figure 5A:
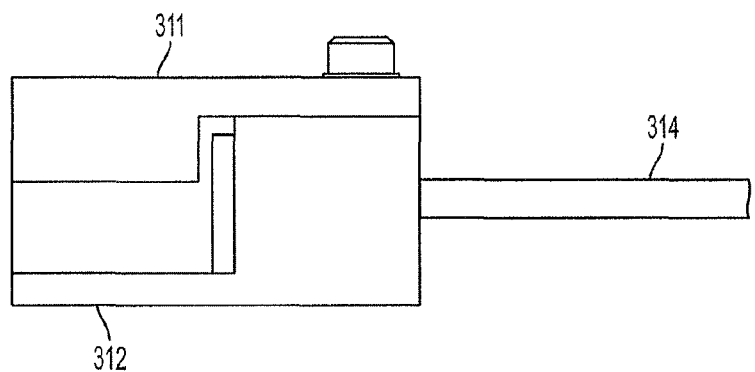
FIG. 5A shows a side view of the embodiment of the apparatus for holding an end cap for splicing.

FIG. 5A shows a side view of the end cap holder of the embodiment. Embodiments of the end cap holder includes the mounting projection 314 for mounting to a splicing device. However, the mounting projection may not be necessary. The end cap holder may be directly mounting to an associated machine for splicing. The associated machine may have a mounting method to hold the end cap holder. The associated machine may have a mounting method with a corresponding shape to the end cap holder.

In another alternative embodiment, the end cap holder may merely have a mounting cavity, on an side opposite to the end cap opening, for mounting to an external mounting piece of an associated machine.

Figure 5B:
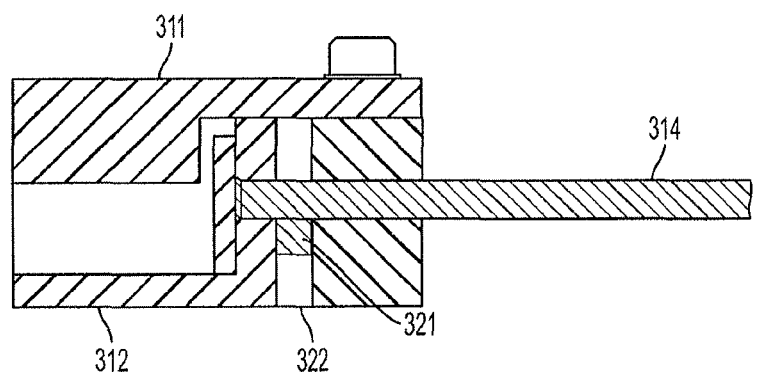
FIG. 5B shows a section view of an embodiment of the apparatus for holding an end cap for splicing taken along line I-I of FIG. 3.

FIG. 5B shows an section view of an embodiment of the end cap holder. In one embodiment, the end cap holder may have a hole for insertion of a shaft as the mounting projection. In one embodiment, the hole may be a cylindrical bore in one of the pieces of the holder and a corresponding cylindrical shaft 314 may be inserted into the bore as the mounting projection.

In one embodiment, the cylindrical shaft 314 may be perpendicular to a threaded retaining hole 322, where a retaining screw 321 can be inserted to secure the cylindrical shaft. The retaining screw can be used to ensure the cylindrical shaft is securely fastened to the holder. At the same time, this embodiment allows for replacement of individual components, such as the pieces of the holder or the cylindrical shaft.

In one embodiment, the mounting projection may have reference markings in order to provide a reference mark for use of the end cap holder with an associated machine.

In alternative embodiments, various other mounting methods may be used. The mounting projection need not be a cylindrical shaft. The mounting projection may have a cross section of another polygonal shape, such as triangular or hexagonal.

In an alternative embodiment, the mounting projection may be integrally formed with the first piece. Alternatively, the mounting projection may be externally fixed to the first piece.

Figure 6:
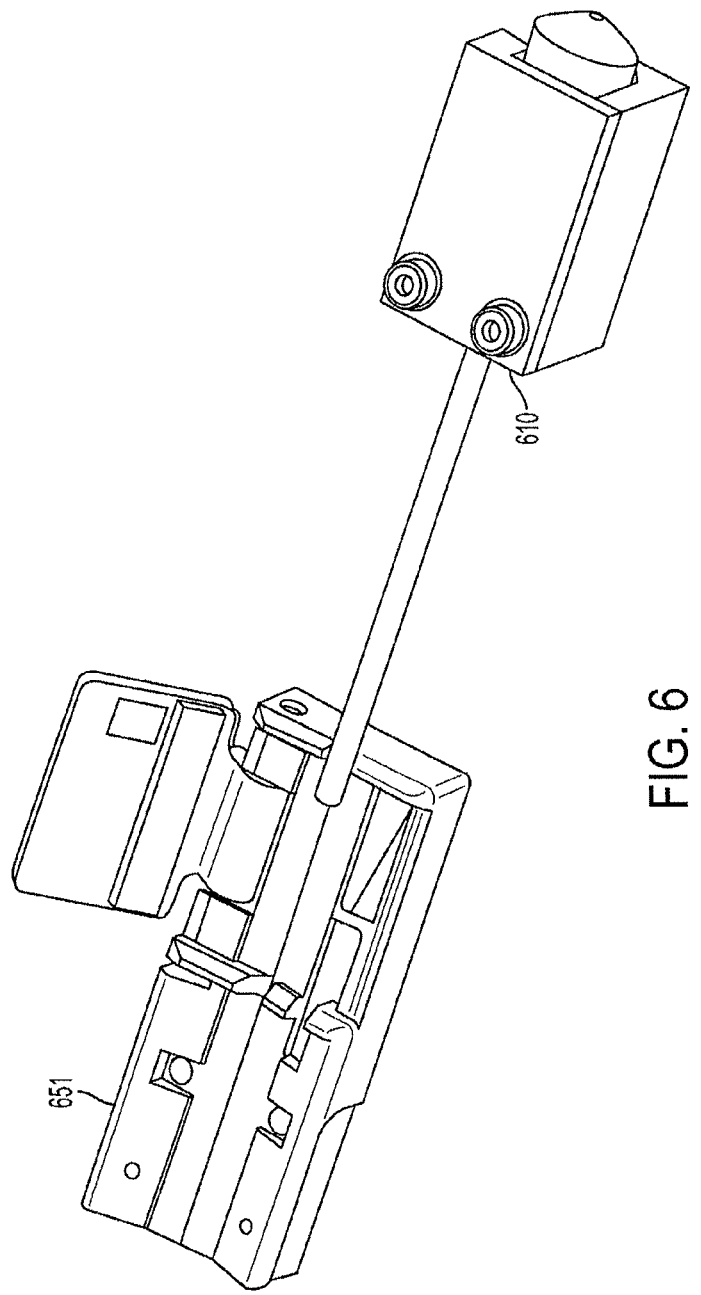
FIG. 6 shows an embodiment of the apparatus for holding an end cap for splicing corresponding to a holding platform of a splicing device.

FIG. 6 shows an embodiment of the end cap holder 610 and how it may connect with an optical fiber holder 651 of a splicing device.

One example of an embodiment of the mounting projection includes a cylindrical shaft for mounting in a fiber holder platform of the AFL LZM-100.

Figure 7:
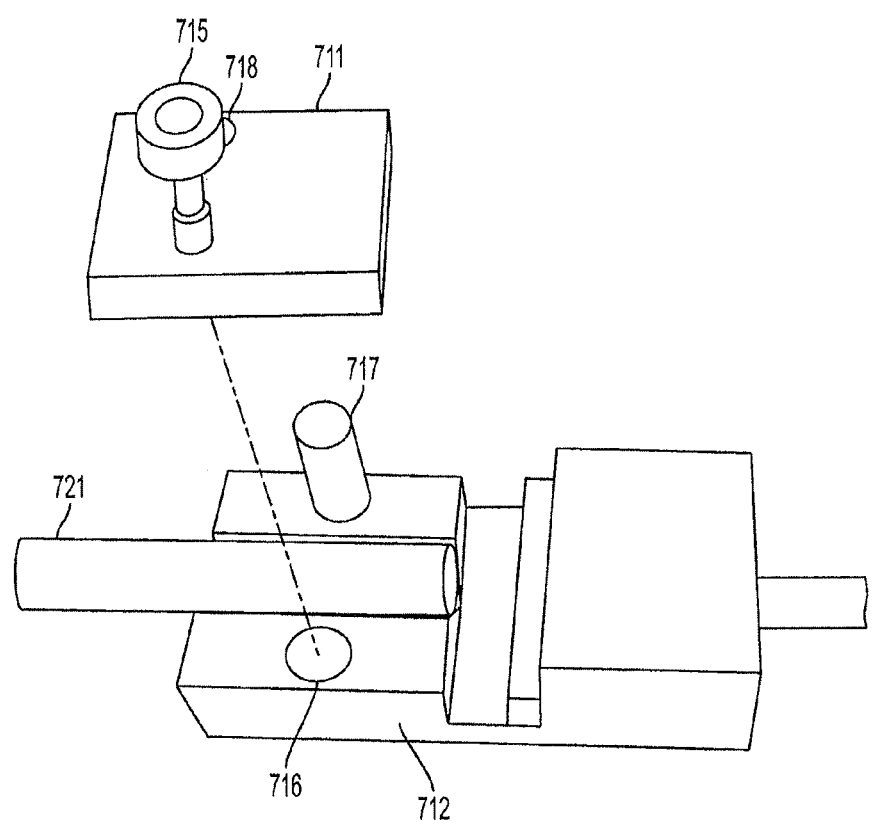
FIG. 7 shows a first embodiment of an apparatus for holding an end cap for splicing.

FIG. 7 shows a second embodiment where the first piece has a v-groove for accommodating an end cap. The end cap 721 may reside in a v-groove in the first piece 712.

In one embodiment, the second piece 711 may be fastened by means of a bolt 715 and corresponding hole 716 on one side of the v-groove and a pin 717 and corresponding hole 718 arrangement on another side of the v-groove. The arrangement of only one bolt with a pin may provide for a level second piece engagement relative to the first piece. However, alternative fastening arrangements may be used. For example, two fasteners, such as bolts, may be used.

Figure 8:
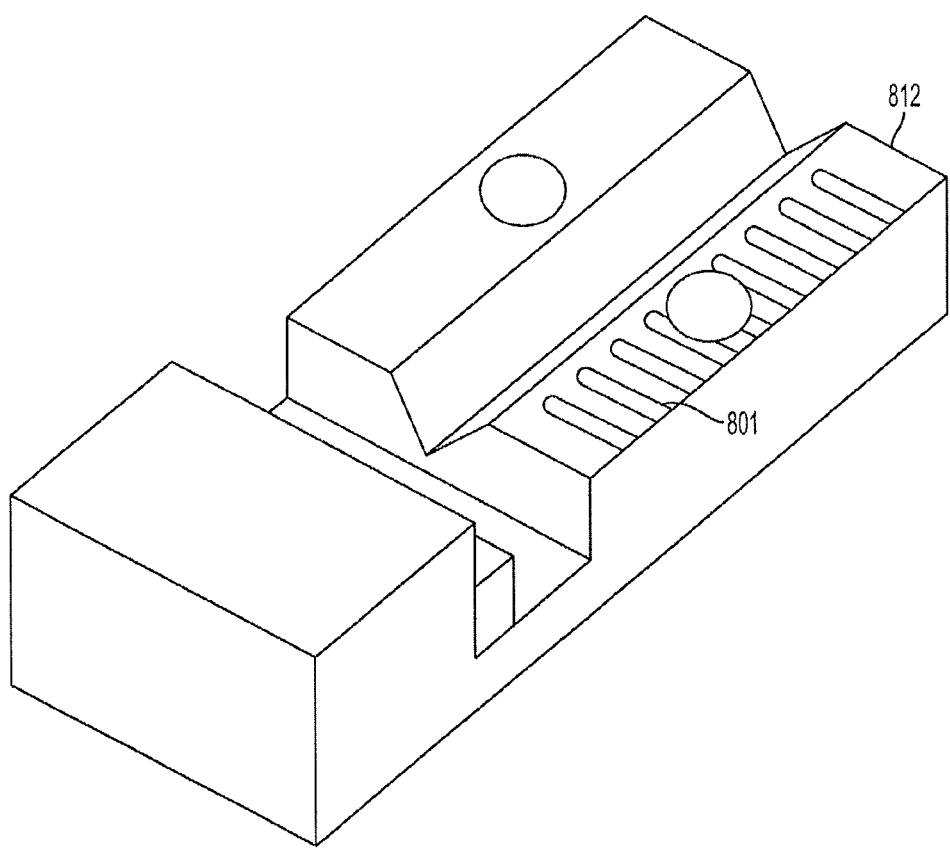
FIG. 8 shows a second embodiment of an apparatus for holding an end cap for splicing.
Figure 9:
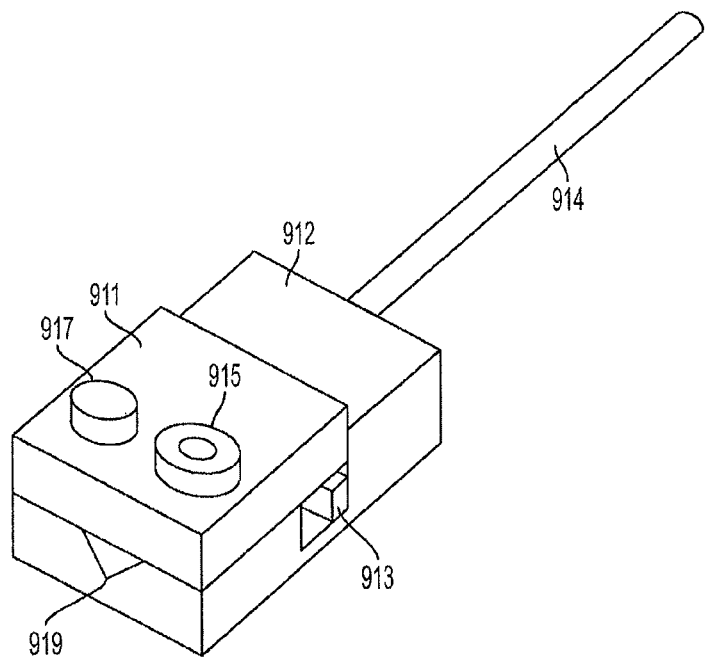
FIG. 9 shows an embodiment of an apparatus for holding an end cap for splicing.
Figure 10:
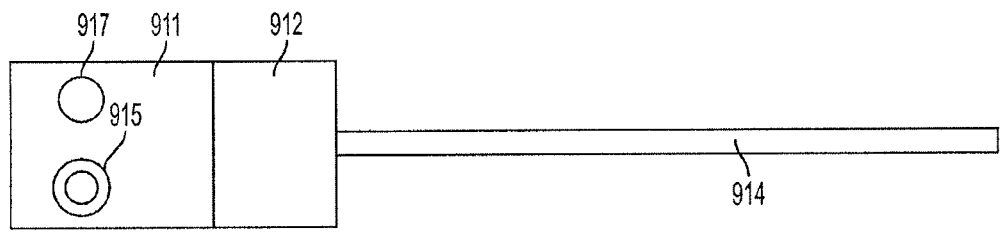
FIG. 10 shows a top view of the embodiment of the apparatus for holding an end cap for splicing.
Figure 11:
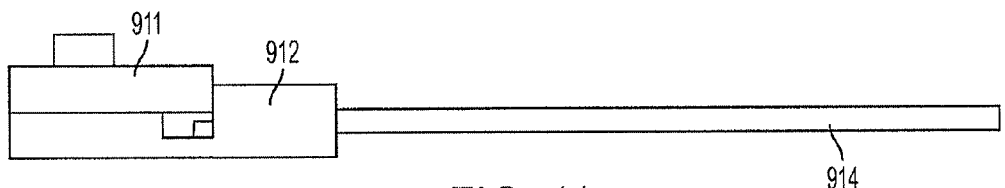
FIG. 11 shows a side view of the embodiment of the apparatus for holding an end cap for splicing.
Figure 12:
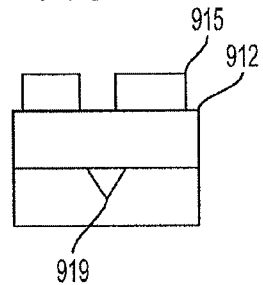
FIG. 12 shows a front view of the embodiment of the apparatus for holding an end cap for splicing.

FIG. 8 shows an embodiment of a first piece 812 having reference markings 801 next to the v-groove for the end cap. The reference markings 801 may be of a predetermined spacing for aid in loading shorter end caps. For example, a predetermined spacing may be in increments of 1 millimeter.

FIGS. 9-12 show the embodiment having a v-groove for holding an end cap.

FIGS. 9-12 show the end cap holder having a first piece 912 having a v-groove 919 for holding an end cap and a second piece 911. The end cap holder can be held with a fastener 915 and pin 917 system. Also, embodiments of the end cap holder can include a sponge 913 on the first piece 912 for cushioning an end cap. In one or more embodiments, the end cap holder includes a mounting projection 914.

In one embodiment, the end cap holder may have a hole for insertion of a shaft as the mounting projection. In one embodiment, the hole may be a cylindrical bore in one of the pieces of the holder and a corresponding cylindrical shaft 914 may be inserted into the bore as the mounting projection.

In alternative embodiments, various other mounting methods may be used. The mounting projection need not be a cylindrical shaft. The mounting projection may have a cross section of another polygonal shape, such as triangular or hexagonal.

In an alternative embodiment, the mounting projection may be integrally formed with the first piece. Alternatively, the mounting projection may be externally fixed to the first piece.

In one embodiment, the mounting projection may have reference markings in order to provide a reference mark for use of the end cap holder with an associated machine.

Figure 13:
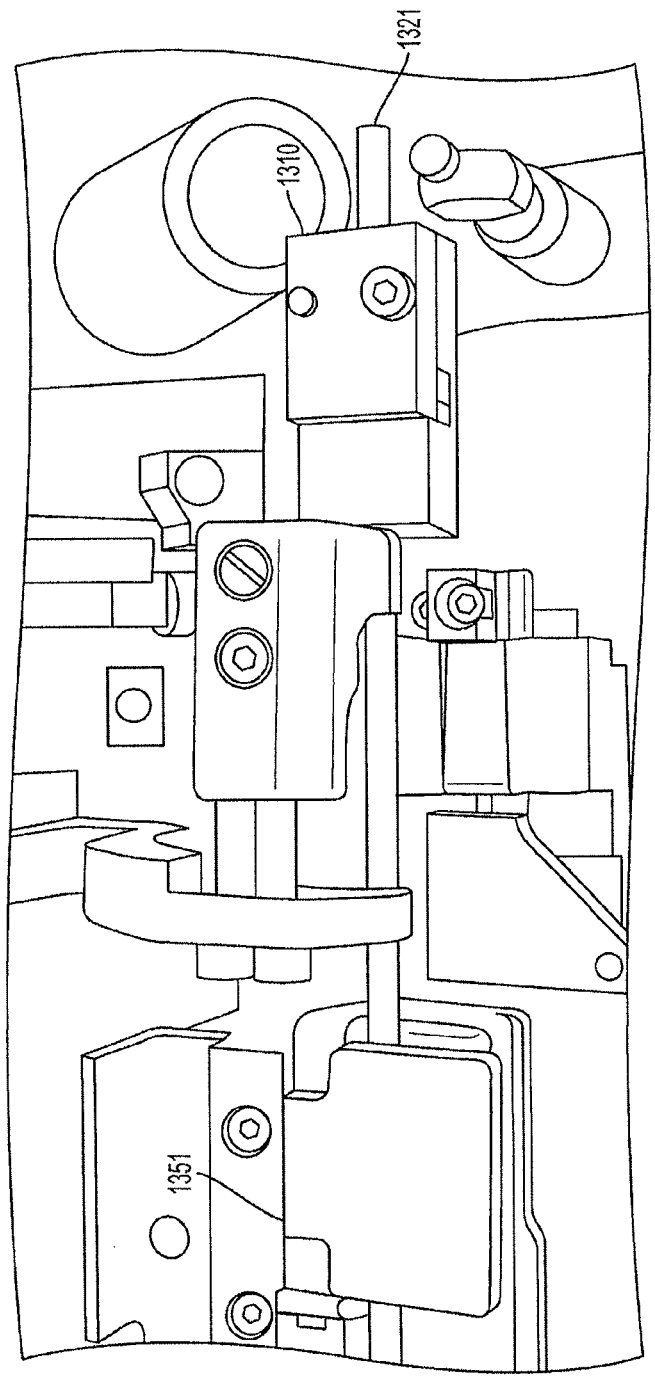
FIG. 13 shows an embodiment of the apparatus mounted to a splicing device.

FIG. 13 shows an exemplary embodiment where an end cap holder is mounting to a splicing device. The embodiment shows the cylindrical shaft mounting projection of the end cap holder 1310 being retained by a fiber holder platform 1351. By mounting the end cap holder to the machine, the end cap 1321 can be axially aligned without tilting relative to an optical fiber for splicing.

Figure 14:
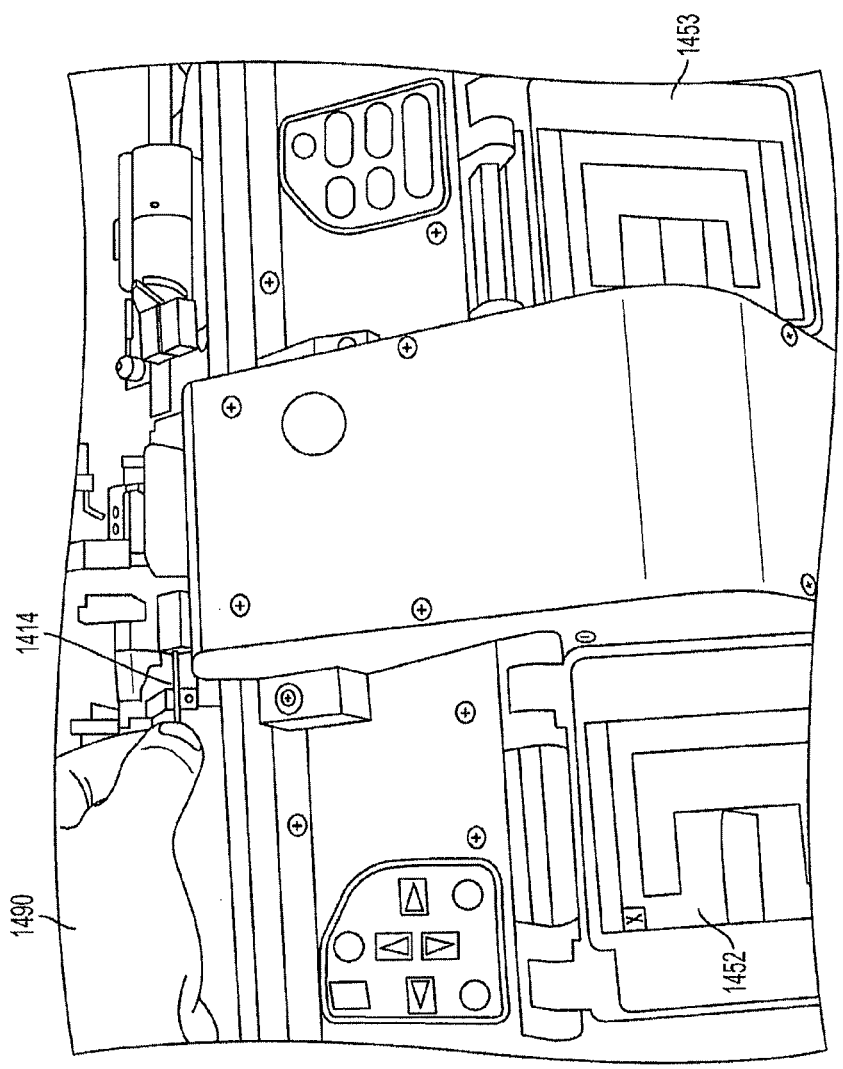
FIG. 14 shows an embodiment of the apparatus mounted to a splicing device.

FIG. 14 shows a method by which the end cap holder can be used to align an end cap with an optical fiber. After mounting of the end cap holder to a splicing device, a user 1490 can rotate the mounting projection 1414 of the end cap holder in order to optimize the end cap position for splicing with an optical fiber. In one exemplary embodiment, this optimization can occur by observing a field of view of at least one view. In one exemplary embodiment, the position of the end cap may be determined by viewing two fields of view, X 1452 and and Y 1453 on a splicing machine.

For different end cap diameters, rotation of the end cap holder may be required in order to optimize the position of an end cap for splicing.

The end cap holder may be an accessory for a splicing machine.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

The various components of the end cap holder may be made from a variety of materials, not limited to metals, composites, or plastics. It is noted that various combinations of components of similar or differing materials may be used.

The invention claimed is:

1. An end cap holder, the holder comprising:
a first piece, the first piece having a holding portion for accepting an optical fiber end cap, the holding portion comprising a first surface and a second surface, the second surface substantially perpendicular to the first surface; and
a second piece, the second piece comprising a contacting surface,
wherein the first surface, second surface, and contacting surface are internal surfaces for contacting the optical fiber end cap and each extend along a longitudinal axis of the end cap holder, and wherein the first piece and the second piece are configured to hold the optical fiber end cap,
wherein the holder further comprises a mounting projection on a side of the first piece opposite to a side of the holding portion, and wherein the first piece further comprises a hole for accepting the mounting projection and a retaining part to retain the mounting projection.

2. The end cap holder according to claim 1, the holder further comprising a sponge.

3. The end cap holder according to claim 1, wherein the holding portion of the first piece comprises reference marks of predetermined spacing.

4. The end cap holder according to claim 1, wherein the first piece is connected to the second piece by at least one fastener.

5. The end cap holder according to claim 1, wherein the second piece fastens to the first piece to hold the optical fiber end cap by at least three points of contact.

6. A method for aligning an end cap for splicing with an optical fiber, the method comprising:
mounting the end cap to an end cap holder, the end cap holder comprising a first piece, the first piece having a holding portion for accepting the end cap, and a second piece, wherein the end cap when mounted in the end cap holder is contacted by at least three points of contact, and wherein at least two of the points of contact are substantially perpendicular surfaces of the first piece and each of the three points of contact extends along a longitudinal axis of the end cap holder, wherein the holder further comprises a mounting projection on a side of the first piece opposite to a side of the holding portion, and wherein the first piece further comprises a hole for accepting the mounting projection and a retaining part to retain the mounting projection;
mounting the end cap holder to a splicing device; and
splicing the end cap with the optical fiber.

7. The method for aligning the end cap for splicing with the optical fiber according to claim 6, the method further comprising rotating the end cap holder relative to the splicing device.

8. The method for aligning the end cap for splicing with the optical fiber according to claim 6, wherein the end cap holder is mounted to the splicing device by means of a mounting projection of the end cap holder.

9. The end cap holder of claim 1, wherein the first surface and the second surface are each planer surfaces.

10. The end cap holder of claim 6, wherein at least two of the points of contact are planer surfaces.

11. An end cap holder, the holder comprising:
a first piece, the first piece having a holding portion for accepting an optical fiber end cap, the holding portion comprising a first surface and a second surface, the second surface substantially perpendicular to the first surface;
a second piece, the second piece comprising a contacting surface; and
a mounting projection on a side of the first piece opposite to a side of the holding portion,
wherein the first surface, second surface, and contacting surface are internal surfaces for contacting the optical fiber end cap, and
wherein the first piece further comprises a hole for accepting the mounting projection and a retaining part to retain the mounting projection.

12. The end cap holder according to claim 11, the holder further comprising a sponge.

13. The end cap holder according to claim 11, wherein the holding portion of the first piece comprises reference marks of predetermined spacing.

14. The end cap holder according to claim 11, wherein the first piece is connected to the second piece by at least one fastener.

15. The end cap holder according to claim 11, wherein the second piece fastens to the first piece to hold the optical fiber end cap by at least three points of contact.

\* \* \* \* \*